Oct. 5, 1965 J. B. JAMES ETAL 3,210,731

MATRIX SWITCHING ARRANGEMENTS

Filed Feb. 6, 1961 2 Sheets-Sheet 1

INVENTORS
JOHN BERNARD JAMES
WILLIAM GEOFFREY EYLES
BY Hane and Nydick
ATTORNEYS

MATRIX SWITCHING ARRANGEMENTS

Filed Feb. 6, 1961 2 Sheets-Sheet 2

INVENTORS
JOHN BERNARD JAMES
WILLIAM GEOFFREY EYLES
BY Hane and Nydick
ATTORNEYS 3,210,731
MATRIX SWITCHING ARRANGEMENTS John Bernard James and William Geoffrey Eyles, Stevenage, England, assignors to International Computers and Tabulators Limited, London, England Filed Feb. 6, 1961, Ser. No. 87,316
Claims priority, application Great Britain, May 3, 1960, 15,542/60
7 Claims. (Cl. 340—166)

This invention relates to matrix switching circuits in which a selected circuit is energised by applying potentials to a selected conductor in each of two groups of conductors.

One application of matrix switching circuits occurs in the selection of groups of magnetic storage cores within a large array of storage cores. Each group of cores may store all the bits representing one word of information, for example. All the cores of a group are selected at the same time to enable a word to be written into, or read out from, the store.

It is the object of the invention to provide an improved matrix switching arrangement which is particularly suitable for switching at relatively high speeds.

According to the one aspect of the invention matrix switching apparatus includes first and second sets of co-ordinate conductors, a plurality of load circuits to be selectively energised, each load circuit including a diode in series with a load and being connected between a conductor of each set, switching means for each set of conductors operable to apply an operating potential to a selected conductor in each set to energise that one of the load circuits connected between the selected conductors, and means for applying a biassing potential to the conductors of one of said sets to prevent the voltage developed across the selected load producing current flow through unselected load circuits.

According to another aspect of the invention switching apparatus for selecting one of a plurality of groups of magnetic storage cores arranged in a matrix includes first and second sets of co-ordinate conductors, a plurality of load circuits, each load circuit including a load winding linked with all the cores of one of said groups in series with a diode and being connected between a conductor of each set, switching means for each set of conductors operable to apply an operating potential to a selected conductor in each set to energise that one of the load circuits connected between the selected conductors, and means for applying a biassing potential to one of said sets effective on the unselected conductors of said one set to prevent the voltage developed across the selected load circuit producing current flow through unselected load circuits.

Where the load circuit includes a winding coupled to a group of magnetic storage cores, each group of storage cores may be coupled to a pair of such windings.

Each switch may include a transistor, the conductivity of which is determined by a control potential applied to an electrode thereof. Alternatively, each switch associated with one set of conductors may consist of a magnetic switching core and each switch associated with another set of co-ordinate conductors may consist of a transistor.

Figure 1:
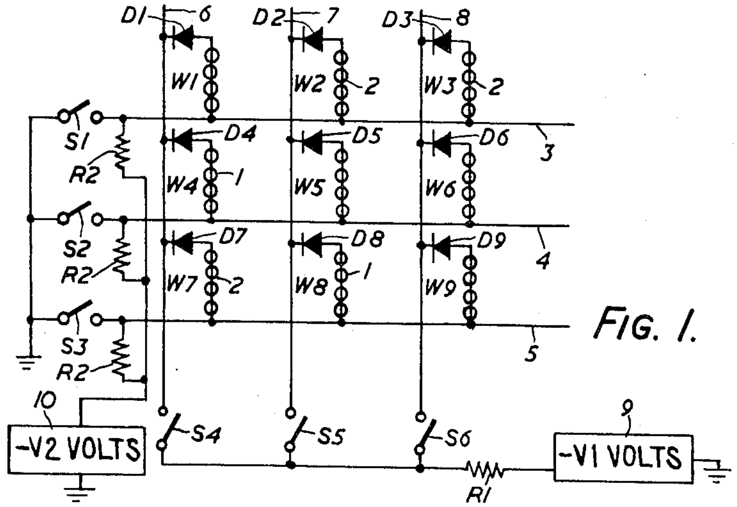
Figure 2:
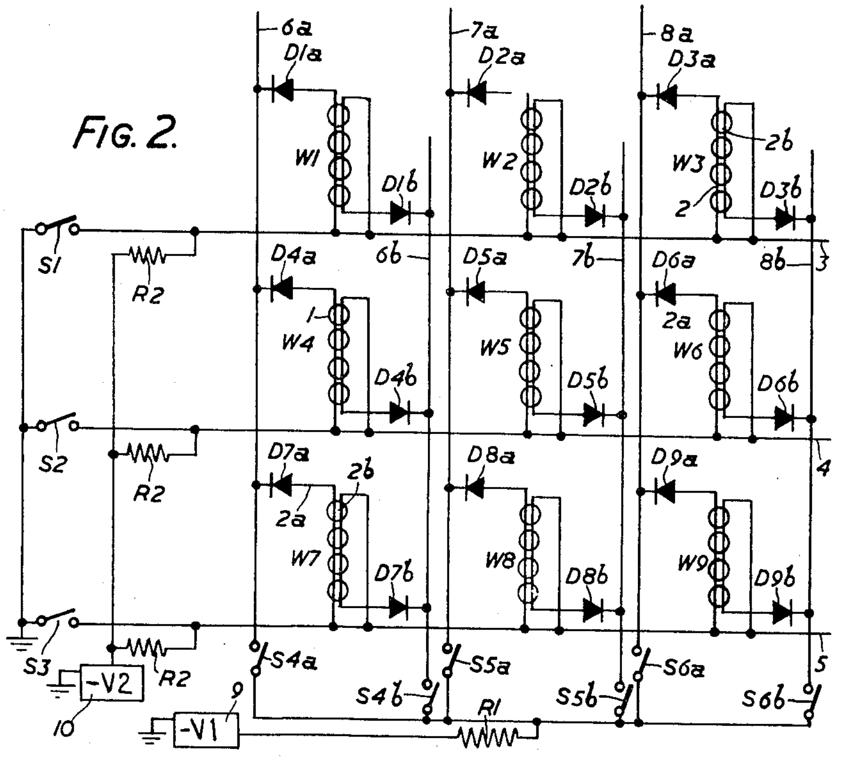
Figure 3:
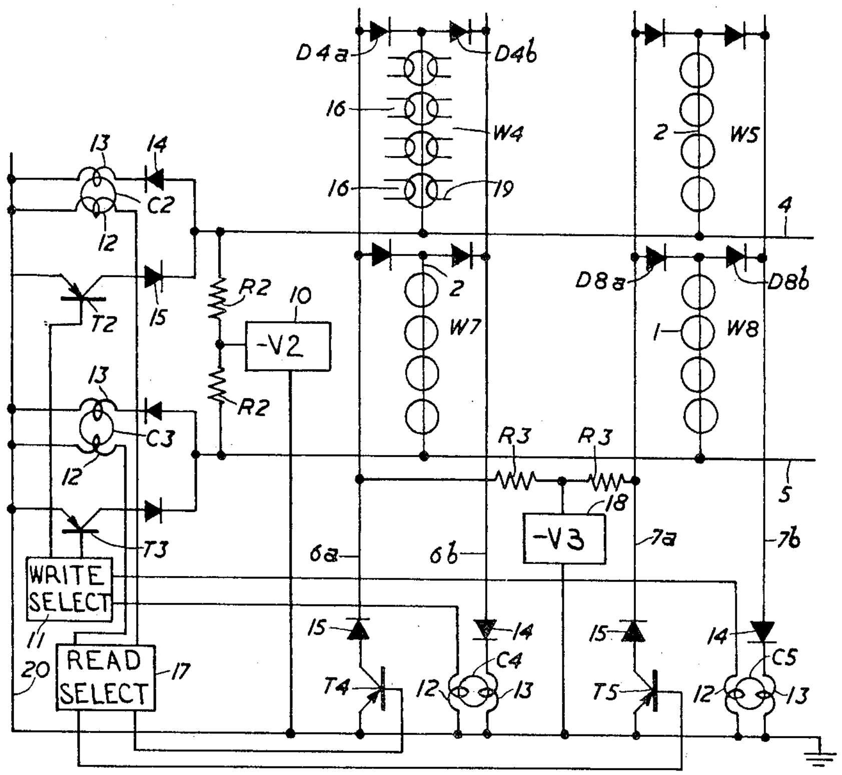
Figure 4:
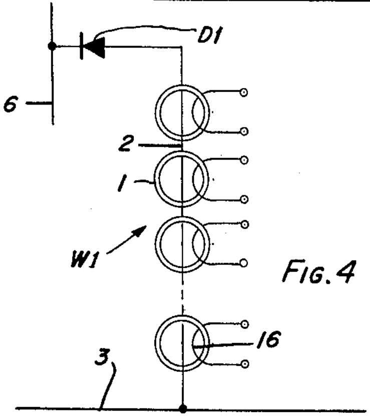

The invention will now be described, by way of example, with reference to the accompanying drawings, in which:

FIGURE 1 is a schematic drawing of part of an array of magnetic storage cores embodying a switching matrix, FIGURE 2 is a schematic drawing of an alternative arrangement of part of the magnetic core array, FIGURE 3 is a simplified circuit diagram showing one arrangement for selectively energising the conductors of a switching matrix, and FIGURE 4 shows, on an enlarged scale, a group of the magnetic storage cores of FIGURE 1.

FIGURE 1 shows part of an array of magnetic storage cores in which cores 1 are arranged in groups, such as W1, W2, W3, etc., each of which is capable of storing all the bits of a word. One such group W1 is shown on an enlarged scale in FIGURE 4. Only four cores have been shown in each group in the interests of clarity, but it will be appreciated that each group would usually comprise a much larger number of cores in practice. For example, each group might comprise forty cores to store the forty bits required to express a word of ten decimal digits in binary coded decimal form.

Each group of cores has a winding 2 coupled thereto, the winding being shown as a single turn winding in FIGURES 1 and 4. Each winding 2 is connected in series with one of the diodes D1 to D9 to form a load circuit. The load circuits are connected to co-ordinate sets of selection conductors, each load circuit being connected between one of a set of row conductors 3, 4 and 5 and one of a set of column conductors 6, 7 and 8. These two sets of conductors, together with corresponding sets of selection switches S1 to S3 and S4 to S6, form a switching matrix for the selective energisation of any desired one of the groups of cores W1–W9. The two sets of three conductors each provides for the selection of the windings associated wth the nine groups of cores W1 to W9. It will be realised that, in practice, a much larger number of conductors is usually provided in each set to allow selection of a correspondingly larger number of groups of cores.

One side of each of the switches S1, S2 and S3 is connected to ground, and one side of each of the switches S4, S5 and S6 is connected to a common resistor R1. A supply source 9 having an operating potential of —V1 volts is connected between the resistor R1 and ground. In order to energise the winding 2 which is coupled to the group of cores W1, the switches S1 and S4 are closed. There is now a circuit from the source 9, through resistor R1, switch S4 (now closed), conductor 6, diode D1, the winding 2 of the group of cores W1, conductor 3 and switch S1 (now closed) back to ground. A current will therefore flow through the winding 2 associated with the cores W1, the magnitude of the current being determined by the value of the resistor R1, the forward resistance of the diode D1 and the impedance of the associated winding. The value of R1 and the voltage V1 are so chosen that the current is substantially independent of variations in the impedance of the winding. The current may be sufficient to switch the cores W1 to one state of magnetic saturation to induce in individual windings 16 (FIGURE 4), which are coupled to each core, signals which are indicative of the previous state of the core. Thus the stored word is read out in conventional manner. The impedance of the winding 2 depends on the number of cores which are switched from the opposite state of saturation by the current in the winding.

It will be seen from FIGURE 1 that there is no other D.C. path between the terminal 9 and ground, other than that just described, with the switches S1 and S4 closed. It may be assumed that the diodes D2, etc., present a purely capacitative impedance in the reverse direction.

Each of the conductors 3, 4 and 5 is connected through a resistor R2 and a supply source 10 at —V2 volts to ground. This provides a biassing potential for diodes such as D4 and D7 which are connected to a conductor which has not been selected by closure of the associated switch. The biassing of these diodes greatly reduces the capacitative load which would otherwise appear between the conductor 6 and ground owing to the capacitative reverse impedance of the various diodes.

A voltage will appear between the conductor 6 and ground when the switches S1 and S4 are closed. This voltage is applied across a number of capacitative shunt paths presented by diodes associated with unselected windings. For example, there is one path through D7, the winding of W7, the winding of W8, the shunt capacity of D8, conductor 7, D2, the winding of W2, conductor 3, and switch S1 to ground. There is a second path through D7, the winding of W7, the winding of W9, the shunt capacity of D9, conductor 8, D3, the winding of W3, conductor 3 and switch S1 to ground. There are corresponding shunt paths through D4.

In the general case of a matrix of $n$ by $n$ lines, the total capacity due to the shunt paths is equal to $(n-1)^2$ times that of the shunt capacity of a single diode. This capacity may be quite large in a large matrix, even though the shunt capacity of a single diode is small. For example, in a matrix of 64, by 64 lines, which provides for the selection of any one of 4096 groups of cores, the shunt capacity is nearly four thousand times that of a single diode. There is also the additional capacity of the switches and the leads to them.

The total shunt capacity may easily become so large that it determines the maximum operating speed of the store and sets a limit well below the speed at which a single word group of cores may be operated. This is obviously a serious limitation on the operating characteristics of the storage system.

It has been assumed that the diodes D4 and D7 are able to conduct to provide the shunt paths. However, if the voltage V2 is larger the maximum voltage which can appear across a load circuit when it is energised, then the diodes D4 and D7 will not conduct. This breaks the shunt paths which exist when these diodes can conduct, and the shunt capacity is reduced to that of the diodes D4 and D7 in parallel. Thus, the shunt capacity is reduced to $(n-1)$ times that of a single diode, in the general case. This is obviously a very substantial reduction, particularly where $n$ is large, and allows a considerable increase in the operating speed of the matrix.

The same analysis applies equally whatever pairs of conductors of the two groups may be selected. It is desirable that the switches of the conductors which have the bias voltage applied to them should be operated first, since the closing of one of these switches produces a temporary disturbance of the bias voltage appearing on the other lines of the group. The amplitude and duration of this disturbance depend on the capacity of these conductors to ground, the shunt capacity of the diodes and value of resistors R2. A switch of the other group of conductors may be closed after this disturbance has died away. Alternatively, the circuit constants may be so chosen that the disturbances are sufficiently small not to interfere with the correct biassing of the diodes. The biassing may be effected equally well by connecting the resistors R2 to the conductors 6, 7 and 8 and using a positive voltage bias supply.

It is frequently required, in core storage matrices, to drive a selected group of cores towards each of two stable states at different times during an operating cycle. For example, in order to store a word in a selected group, a so-called "half-current" may be applied to all the cores of the group during a writing, or storage, phase of the cycle, individual cores of the group being switched to the first of the stable states by the concurrent application of additional half-currents to other windings linked with the cores as required for the storage of the word. During a reading phase of the cycle a switching current may be applied to all the cores of the selected group, and this current tends to switch all the cores to the second, opposite, of the stable states. Hence, any cores switched to the first state during the writing phase are reset to the second state during the reading phase. The writing and reading selection currents may each be applied to a separate winding linking with all the cores of the group or they may both be applied to a single winding. In the former case the windings are so linked to the cores having regard to the directions in which the writing and reading selection currents flow that the cores tend to switch in opposite directions. In the latter case the writing and reading currents flow through the common winding in opposite directions.

FIGURE 2 shows a modification to the arrangement of FIGURE 1 in which two windings are linked with each group of cores. For the purpose of selecting a core group for writing, the arrangement operates as described with reference to FIGURE 1, the writing selection lines **2*a* being arranged in series with diodes D1*a* to D9*a* respectively for the groups W1 to W9 and the selection being performed by switches S1, S2, S3 and switches S4*a*, S5*a* and S6*a* in conjunction with column conductors 6*a*, 7*a* and 8*a* in the manner previously described. Each group of cores also has a second winding 2*b* for selecting a word group during the reading phase. The windings 2*b* of the groups W1 to W9 are respectively connected in series with diodes D1*b* to D9*b* and the selection of a word group is performed in a similar manner to that previously described using switches S1, S2, S3 and switches S4*b*, S5*b* and S6*b* in conjunction with column conductors 6*b*, 7*b* and 8*b*. In this case it will be appreciated that, since the selection currents flow in the same direction in the matrix from the switches, a single biassing voltage supply 10 provides the requisite bias for both writing and reading selection. It will also be appreciated that although for the sake of clarity the windings 2*b* are shown diagrammatically such that the selection currents flow therein in the opposite direction through a core group to that in which currents flow through the windings 2*a* in practice the currents flow through the windings 2*a* and 2*b*** with respect to the core groups in a direction dependent upon the sense in which the windings are linked to the cores of the groups.

A writing operation on a single word group thus requires the selection of the writing load circuit associated with the group by the selection of one of each of the co-ordinate sets of conductors 3, 4, 5 and **6*a*, 7*a*, 8*a*, whereas a reading operation requires the selection of one of each of the sets 3, 4, 5 and 6*b*, 7*b*, 8*b*. Hence the set of conductors 3, 4, 5 is common to both operations, the remaining co-ordinate set being selected according to the operation to be performed. In a practical matrix it may be desirable to provide interlocking controls to ensure that only the appropirate one of these sets is selected in dependence upon the operation required. For example, a reading control circuit may be used to ensure that only the switches S4*b*, S5*b* and S6*b* are conditioned for selection during a reading operation and a writing control circuit may be similarly used to condition the switches S4*a*, S5*a* and S6*a***.

It will be appreciated that the representation of the switches S1 to S6 as electrical contacts is diagrammatic and that, in practice each switch takes the form of a thermionic valve, a transistor or equivalent high speed switch. One set of switches may be replaced by devices, such as magnetic cores, which combine the functions of switching and pulse generation. It is convenient to provide for pulse voltage of both polarities to be applied to a single winding linked with each group of cores to facilitate the operations of reading and writing. FIGURE 3 shows in more detail a preferred circuit arrangement for realising the switches S1, S2 etc. with provision for both reading and writing. In this figure a common winding linking with all the cores of a group is used for both writing and reading selections.

Common elements are given the same reference in FIGURES 1 to 4. As in FIGURE 2 each of the column conductors of FIGURE 1 is replaced by a pair of conductors **6*a* and 6*b*, 7*a* and 7*b*** etc. One conductor of the pair is selected for the writing phase and the other conductor of the pair is selected for the reading phase. Comparing the writing circuit of FIGURE 3 with the schematic circuit of FIGURE 1, transistors T2 and T3 are equivalent to the switches S2 and S3, and magnetic cores C4 and C5 are equivalent to the switches S4 and S5 together with the common voltage source provided through the resistor R1. In the reading circuit of FIGURE 2, transistors T4 and T5 are the equivalents of the switches S4 and S5, and cores C2 and C3 are equivalent to the switches S2 and S3 and also provide the voltage source.

In order to read information from the group of cores W4, for example, a read selection circuit 17 applies a voltage to the base of the transistor T4 to allow it to conduct. At the same time, or preferably a little later, the read selection circuit 17 applies a current to a winding 12 which is coupled to the core C2. The core C2 is a conventional magnetic switching core with a rectangular hysteresis characteristic, and the current in the winding 12 switches the core from one state of saturation to the other. The switching of the core C2 induces a substantially constant current pulse in winding 13. This current flows through diode 14, conductor 4, diode D4*a*, the common winding 2 of the group of cores W4, conductor 6*a*, diode 15 and transistor T4 to ground. The current flowing in this circuit is sufficient to drive all the cores of the group W4 to saturation in one direction. Any of the cores in the group W4 which are switched from the opposite state of saturation will induce read out signals in individual read out windings 16, in the usual manner.

The core C2 is reset after the cores of the group W4 have been read by the read selection circuit 17 applying a current to the winding 12 in a direction opposite to that of the first applied current. The diode 14 prevents any current flowing as a result of the voltage induced in the winding 13 by the resetting of the core. The switching cores may, of course, be provided with a separate winding for resetting purposes.

A bias applied to the column conductors through the resistors R3 (FIGURE 3) from a supply source 18 at —V3 volts reduces the capacitative shunting effect of the load circuit diodes in exactly the same manner as has been described earlier in relation to the operation of the arrangement of FIGURE 1.

The energisation of the winding coupled to all the cores of the group W4 to write information into the cores is effected in a similar way to the reading operation which has just been described. A write select circuit 11 applies a voltage to the base of transistor T2 and switches the core C4. There is then a circuit for the current pulse induced in the winding 13 of the core C4 through diode 14, conductor 6*b*, diode D4*b*, the common winding 2 of the group of cores W4, conductor 4, diode 15 and transistor T2 to ground. The writing current is in the opposite direction to the reading current and the amplitude is half that required to switch the cores of the group W4. Corresponding half currents are applied to selected ones of individual writing windings 19, so that selected cores of the group W4 are set in the conventional manner to represent information to be stored.

The bias voltage applied to the row conductors from the source 10 through resistors R2 reduces the shunt capacity during a writing operation in the manner explained above.

When one of the transistors T2, T3 is made operative, a conductive path is established from the row conductors to ground through that transistor. The value of the resistors R2 has to be sufficiently high to limit the current sufficiently to ensure that the maximum power dissipation of the transistor is not exceeded. At the same time, the value of the resistors should be sufficiently low to provide an acceptable time constant for the recovery of the row conductors. The bias voltage V2 may be less than the bias voltage V3, since the voltage developed across the load circuit for a writing operation is less than that for a reading operation.

It will be appreciated that the arrangement shown in FIGURE 3 enables a common winding to carry both reading and writing currents, with a consequent simplification in the wiring of the store. However, two separate windings may be used, as described with reference to FIGURE 2, if desired.

In the arrangements shown in FIGURES 1 and 2, the switches S1 to S3 are connected between the matrix and ground and the supplies 9 and 10 are also connected at one side to ground. These ground connections form a common return line for the selection and biassing circuits. In the circuits shown in FIGURE 3, the common return line is provided by a single conductor 20 linking the various circuits. However, in a practical matrix operated at high frequencies it is desirable to reduce the inductance of the circuit to as low a value as possible. This may be done, for example, by providing separate return paths for each of the row and column conductors. One way in which these paths may be arranged is by the provision of an additional row and column return conductor for each core-transistor pair. For example, a row return conductor would be provided connected to the common junction of the transistor T2 and the core C2. A similar conductor would be provided for each of the transistor-core combinations T3–C3, T4–C4 and T5–C5, the first mentioned being a row conductor and the latter two both column conductors. These return conductors are arranged along the rows and columns of the matrix and each row return conductor is connected to each column conductor that it crosses. This arrangement reduces the effective length of return path for any selection and so reduces the inductance of the circuit as well as eliminating open loops in the circuit. Thus the common return line, in an arrangement of this kind, is formed by the network of return conductors. However, this arrangement also increases the total shunt capacity of the circuit, so making the reduction of the shunt capacity due to the diodes of the load circuits even more necessary.

The invention has been described in relation to a diode selection matrix for a magnetic core store, by way of example, but it will be appreciated that it is equally applicable to diode matrices used for other purposes.

We claim:

1. In a switching matrix having a set of column conductors, a set of row conductors, a plurality of load circuits, each consisting of a load winding in series with a diode, one load circuit being connected between each combination of one conductor from each set, a first voltage source, and switch means for selectively connecting the voltage source between one conductor of one set and one conductor of the other set, the improvement consisting of a second voltage source providing a voltage greater than said first voltage source, and means connecting the conductors of said one set to the second voltage source and effective to maintain all the conductors of said one set, except that conductor of the set connected to the first voltage source, at a voltage exceeding the voltage applied to the selected conductor of the other set by said first voltage source.

2. A switching matrix including a plurality of groups of load circuits, each load circuit comprising a load winding and a diode in series; a plurality of column conductors, each column conductor being connected to one end of the load circuits in a group; a plurality of row conductors, each row conductor being connected to the other end of one load circuit in each group; a voltage source; first switching means operable to connect any selected one of the column conductors to the voltage source; second switching means operable to connect any selected one of the row conductors to the voltage source, the operation of both the switching means causing a current to flow from the first voltage source through the load circuit connected between the selected conductors; and biasing means effective to maintain all the row conductors, except the selected row conductors, at a voltage which is of the same polarity, and is greater than the voltage of the selected column conductor due to said current flow through the load circuit.

3. A selective switching arrangement including a first conductor; a plurality of second conductors; a load circuit connected between each of the second conductors and the first conductors, each load circuit comprising a load winding in series with a diode; a transistor connected between each of the second conductors and a common point, each transistor normally being non-conductive; means operable to switch any selected one of the transistors to a conductive condition; a magnetic switch core with two stable magnetic states; a first winding on said core connected between the first conductor and said common point; a second winding on said core; and means operable during the conduction period of the selected transistor to pass a current pulse through said second winding to switch the core from one stable state to the other to induce a voltage pulse in said first winding, the voltage pulse causing a current to flow through the first conductor, the load circuit and the second conductor connected to the selected transistor, and through the selected transistor.

4. A selective switching arrangement including a first conductor; a plurality of second conductors; a normally non-conductive transistor connected between each second conductor and a common point; means operable to switch any selected one of the transistors to a conductive condition; a load circuit, comprising a load winding and a diode, connected between each second conductor and the first conductor; a magnetic switch core with two stable states; a first winding on said core connected between the first conductor and said common point; a second winding on said core; means operable to pass a current through said second winding to switch the core from one stable state to the other to induce a voltage in said first winding, the voltage causing a current to flow through the load circuit connected between the first conductor and the second conductor which is connected to the selected transistor; a voltage source; and resistive means connecting the voltage source to the second conductors and effective to bias all the second conductors, except that one connected to the selected transistor, to a voltage of the same polarity as, and greater than, said voltage produced across the first winding.

5. A selective switching arrangement including a first conductor, a second conductor and a plurality of third conductors; a plurality of load windings, one end of each load winding being connected to one of the third conductors and the other end of the load winding being connected through oppositely poled diodes to the first and second conductors; a first normally non-conductive transistor connected between the first conductor and a common point; a first bistable magnetic core with first and second windings, the first winding being connected between the second conductor and the common point; a second normally non-conductive transistor connected between each third conductor and the common point; a second bistable magnetic core associated with each third conductor; first and second windings on each second core, the first winding of each core being connected between the associated third conductor and the common point; first control means operable to render a selected one of the second transistors conductive and concurrently to apply a current to the second winding of the first core to switch that core to induce a voltage in the first winding, said voltage causing a first current to flow in a load circuit determined by said selected transistor; and second control means operable to render the first transistor conductive and concurrently to apply a current to the second winding of a selected one of the second cores to switch the selected core to induce a voltage in the first winding of that core, said voltage causing a second current to flow in a load circuit determined by said selected core, said first and second currents being oppositely directed.

6. A selective switching arrangement for groups of magnetic storage cores including a matrix formed by a plurality of row conductors and a plurality of pairs of column conductors; a plurality of load windings, one end of each load winding being connected to a row conductor, the other end of each load winding being connected to a pair of column conductors through oppositely poled diodes, and each load winding being connected to a different combination of row and column conductors; a group of magnetic storage cores coupled to each load winding; a first normally non-conducting transistor connected to each row conductor; a second normally non-conducting transistor connected to one conductor of each pair of column conductors; a first winding connected to each row conductor and coupled to a first bistable magnetic switch core; a second winding connected to the other conductor of each pair of column conductors and coupled to a second bistable magnetic switch core; first control means operable to render conducting a selected one of said first transistors and concurrently to effect switching a selected one of said second switching cores to drive a current through a particular one of the load windings in one direction; first means for biasing the row conductors and operative to maintain all the row conductors, except the conductor connected to said selected transistor, at a voltage greater than the voltage produced across the particular load winding by the current flow therethrough; second control means operable to render conducting a selected one of said second transistors and concurrently to effect switching of a selected one of said first switching cores to drive a current through a particular one of the load windings in the opposite direction; and second means for biasing said one conductor of each pair of column conductors and operative to maintain all said one conductor, except that conductor connected to said selected second transistor, at a voltage greater than the votlage produced across the particular load winding by the current flow therethrough.

7. A matrix switching arrangement, including a plurality of load circuits arranged in rows and columns, each load circuit including a load impedance and a diode connected in series between first and second input points; a set of row conductors, one corresponding to each row of load circuits, respectively, each row conductor being connected to the first input point of each load circuit in the corresponding row; a set of column conductors, one corresponding to each column of load circuits, respectively, each column conductor being connected to the second input point of each load circuit in the corresponding column; switching means operable to energise a selected row conductor and a selected column conductor to pass a current through that load circuit connected to both of said selected conductors; and means to bias to a non-conductive state the diode in each load circuit which is connected to the selected column conductor and to the row conductors other than said selected row conductor.

References Cited by the Examiner

UNITED STATES PATENTS

| | | | |
|---|---|---|---|
| 2,691,151 | 10/54 | Toulon | 340—166 |
| 2,931,017 | 3/60 | Bonn | 340—174 |
| 3,098,216 | 7/63 | Samwel | 340—166 |
| 3,107,341 | 10/63 | Ulmer | 340—166 |
| 3,109,161 | 10/63 | Bobeck | 340—166 |

NEIL C. READ, *Primary Examiner.*

IRVING L. SRAGOW, *Examiner.*